Fig. 1.

Oct. 6, 1925.  1,555,929
J. E. ALLAN
MACHINE FOR CUTTING AND PRESSING FRUIT AND FOR MIXING JUICES
Filed Nov. 8, 1920   6 Sheets-Sheet 2

Oct. 6, 1925.
J. E. ALLAN
1,555,929
MACHINE FOR CUTTING AND PRESSING FRUIT AND FOR MIXING JUICES
Filed Nov. 8, 1920
6 Sheets-Sheet 3

Oct. 6, 1925.

J. E. ALLAN 1,555,929

MACHINE FOR CUTTING AND PRESSING FRUIT AND FOR MIXING JUICES

Filed Nov. 8, 1920     6 Sheets-Sheet 5

Inventor
James E. Allan,
By
Attorneys

Patented Oct. 6, 1925.

1,555,929

UNITED STATES PATENT OFFICE.

JAMES E. ALLAN, OF DETROIT, MICHIGAN.

MACHINE FOR CUTTING AND PRESSING FRUIT AND FOR MIXING JUICES.

Application filed November 8, 1920. Serial No. 422,424.

*To all whom it may concern:*

Be it known that I, JAMES E. ALLAN, a citizen of the United States of America, residing at Detroit, in the county of Wayne and State of Michigan, have invented certain new and useful Improvements in Machines for Cutting and Pressing Fruit and for Mixing Juices, of which the following is a specification, reference being had therein to the accompanying drawings.

This invention relates to a machine for cutting and pressing fruit and for mixing juices. It has for an object the provision of an efficient automatic means by which the juice of any suitable fruit may be extracted and cooled to prepare a drink.

Another object is the provision of a machine having its moving parts displayed to attract the interest and attention of the passers-by.

In the accompanying drawings, I have shown a machine particularly adapted for use in removing the juice from oranges, but it will be evident that the structure may be modified to suit other fruits.

The structure herein described and illustrated is therefore to be considered merely as one preferred embodiment of my invention, and I do not wish to be limited to the exact construction shown but believe myself entitled to such modifications and rearrangements as fall within the scope of the accompanying claims when broadly construed.

In the operation of the device shown in the drawings, oranges are placed in a hopper at the top of the machine and are allowed to enter a chute one at a time. Each orange rolls to the bottom of the chute, where it is engaged by a pair of fingers attached to a funnel which swings on an axis, carrying the fingers engaging the fruit in an arc of a circle lengthwise of a curved knife, the curvature of the blade being somewhat eccentric to that of the path of movement of the fruit so that the blade gradually cuts through the orange. Nearly at the top of the swing of the funnel, spreaders enter the cleft in the orange made by the blade, and separate the lower ends of the two sections so that as the cut is completed, the severed halves slide down into cylindrical upper portions of juice extractors pivoted on the funnel. These juice extractor members have previously been tilted sidewise into the proper position to receive the flat cut surfaces upon perforated ribbed plates. At the end of its swinging movement, the funnel stands vertically beneath the juice extractors. Plungers descend and press upon the orange sections with a twisting downward movement, forcing the cut surfaces against the perforated ribbed surfaces of the extractor plates. The expressed juice and particles of pulp pass through the perforations into the funnel, which has an outlet at one side of its lower end. The plungers of the juice extractor are withdrawn; the funnel swings downward through almost half a circle to drop out the empty rind; another orange rolls down the chute, and the cycle is repeated.

The juice is poured into a mixing chamber surrounded by ice and stirred to cool it or to mix it with other ingredients of various drinks. The entire operating mechanism being exposed to view, attracts the public and forms an effective advertisement, it being immediately apparent that the juice is genuine and freshly pressed from select fruit.

Figure 10:
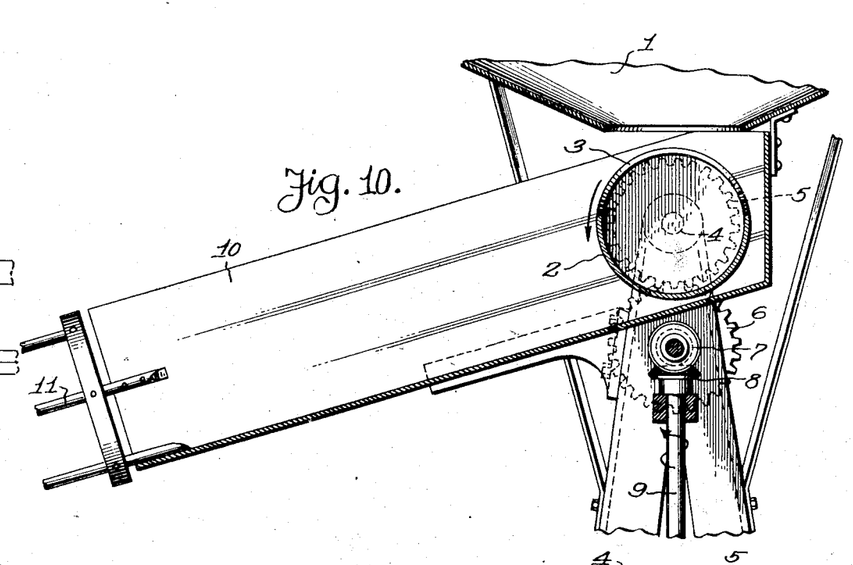
Fig. 10 is a fragmentary vertical section through the rotary delivering means and the upper portion of the chute.
Figure 11:
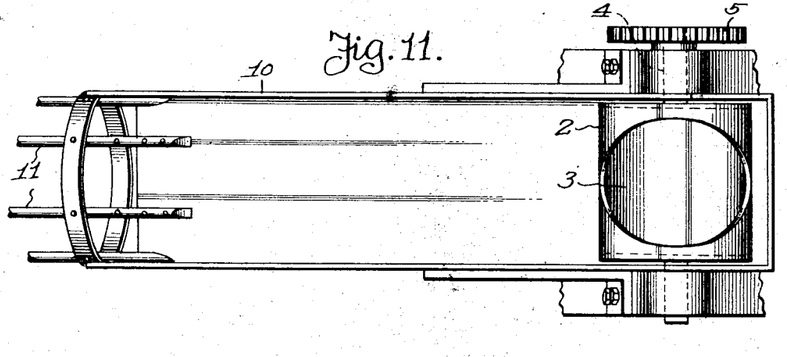
Fig. 11 is a plan view of the parts shown in Fig. 10.

Beneath the hopper 1 is mounted a rotary delivery means consisting of a cylindrical member 2, having an opening 3 in one side. The cylinder and the opening are made of such size that only one orange, or other piece of fruit, can enter at each revolution, and the fruit will be graded before being placed in the hopper so that only those specimens that lie within proper limits of size will be used with each cylinder. The fruit will be received from the hopper while the opening is turned upward and will be allowed to roll down the chute when the cylinder is rotated through a quarter of a revolution or more in the direction indicated by the arrows. This rotation of the cylinder on its pivots 4 is brought about by means of the train of gears 5, 6, 7, and 8 driven by the vertical shaft 9. The chute is shown as having a troughlike upper portion 10 leading to a tubular passage made of curved metal rods 11 at the lower end of which are inwardly bent flat fingers 12 to catch the fruit and hold it in position to be lifted by the curved fingers 13 carried by the swinging funnel 14.

Figures 3, 4, 5:
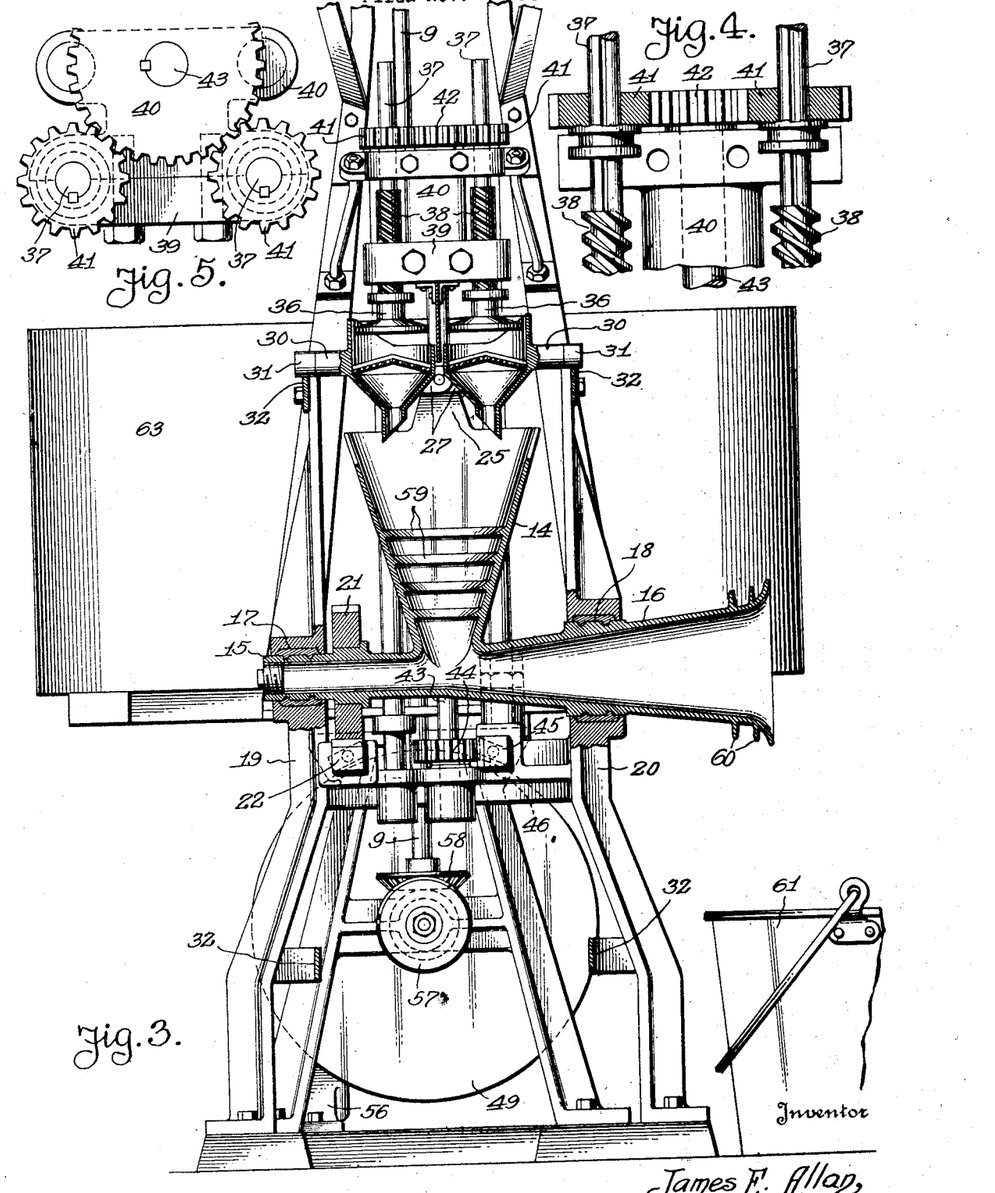
Fig. 3 is an end elevation, the juice extractor and the funnel being shown in section.
Fig. 4 is an end elevation of the bearings for the gears and shafts for operating the plungers of the juice extractors, the front half of the bearing being removed.
Fig. 5 is a plan view of the structure shown in Fig. 4.

As most clearly shown in Fig. 3, the funnel 14 has oppositely directed tubular extensions 15, 16, mounted for rotation in babbitted bearings 17, 18, in the standards 19, 20, forming part of the main framework of the machine. A gear wheel 21 secured to the extension 15 is operated by a rack 22 to swing the funnel through an angle of almost one hundred and eighty degrees, from a vertical position downward. The fingers 13 are secured to the outer end of the funnel 14 and are curved forward to engage the fruit held by the fingers 12 at the lower end of the chute.

Extending upward from the lower end of the chute, and secured at a point beyond the farthest position reached by the fingers 13, is a curved blade 23 having a cutting edge curved on an arc somewhat eccentric to the arc traversed by the center of the fruit carried by the fingers 13. These fingers lie on opposite sides of the blade 23 and are curved far enough forward to hold the orange against the blade as it is forced upward. The eccentricity of curvature of the cutting edge of the knife gives a slicing cut through the fruit for about three fourths of its travel until it reaches an angularly directed cutting edge portion of the blade, shown at 24, which gives the final severing cut that divides the fruit into two pieces.

Brackets 25, formed as extensions of the sides of the funnel 14, support a pivot shaft 26 lying in the plane of the knife blade 23. Upon this shaft 26, are pivoted lugs 27 formed on the side of tubular members 28.

Figure 6:
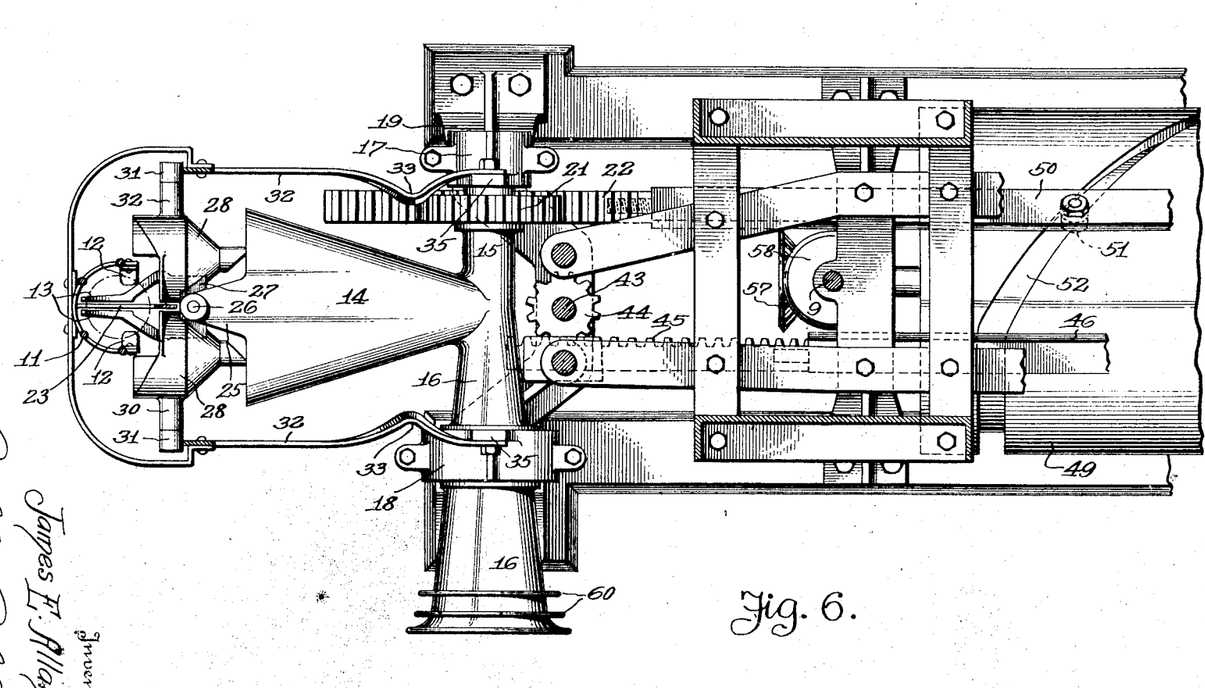
Fig. 6 is a fragmentary plan view of the machine.
Figure 7:
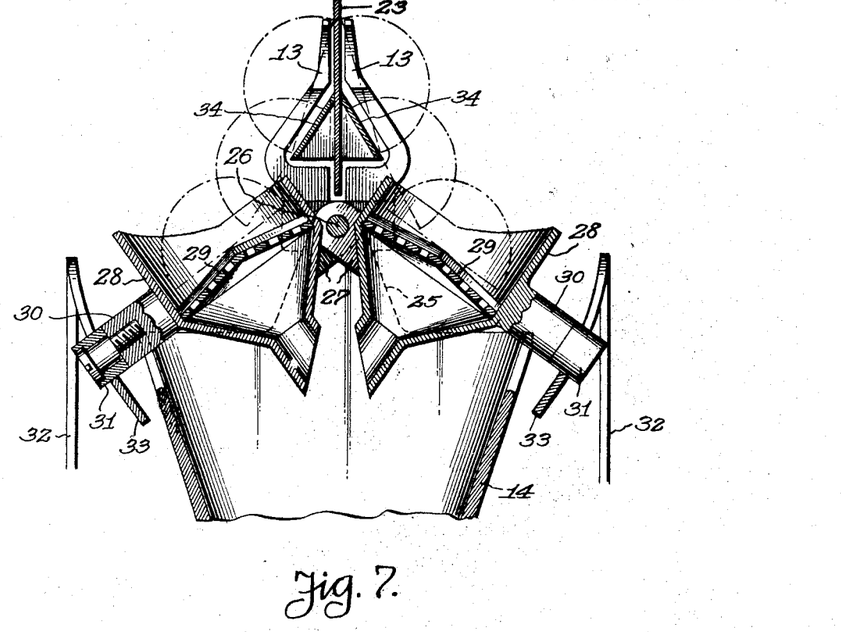
Fig. 7 is a vertical sectional view through the juice extractors showing them in the position they occupy when the swinging funnel has reached the point indicated by the line VII—VII in Fig. 2, looking in the direction indicated by the arrows.
Figure 8:
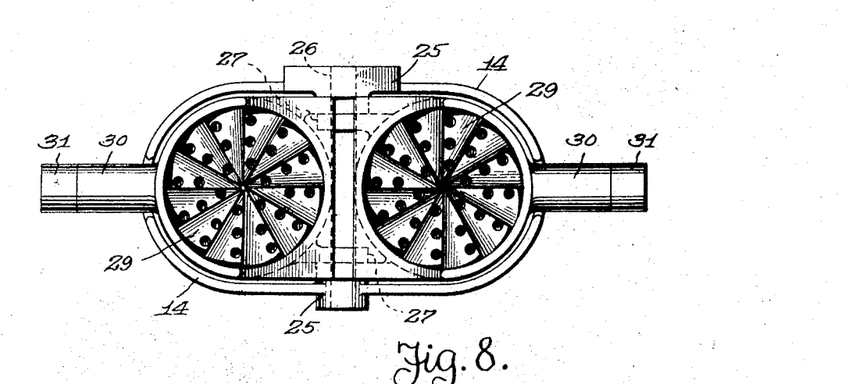
Fig. 8 is a plan view of the juice extractors.

These tubular members have a cylindrical upper portion connected by a tapering section with a smaller tubular lower end, as most clearly shown in Figs. 3, 6, and 7. Perforated plates 29 having a rough or ribbed upper surface are secured in the tubular members at the seat formed at the junction of the tapering section with the upper cylindrical portion. These plates 29 are slightly conical.

On the sides of the tubular members 28 opposite the lugs 27 are studs 30 having the rollers 31 mounted thereon to engage cam guides 32, which have their lower portions curved on an arc substantially concentric with the path of movement of the outer end of the funnel 14. The cam guides have a V-shaped, downwardly directed portion, indicated at 33, down which the rollers 31 travel just before the fruit is severed by the angularly arranged edge 24. As shown in Fig. 7, the rollers 31 have reached the bottom of the depression in the cams 32 and the fruit is shown in dotted lines in various stages of its travel, from the uppermost position, in which it has just been cut apart, to the lowermost position, in which the halves lie with their flat, cut surfaces in contact with the upper faces of the perforated plates 29.

At the sides of the blade 23 below the angularly set edge 24 two spreader members 34 are secured to enter the lower end of the cleft made in the fruit by the knife and to separate the lower edges so that the center of gravity of the cut halves will lie nearer to the blade 23 than do the points with which the lower edges of the halves are in contact. The upper edges will slide down in contact with the blade as the lower edges slide off the spreaders 34 and this will position the flat side of the fruit on the perforated plates which have been tilted down to the proper angle to receive the flat surface. If the plates 29 were horizontal, the lower edges of the cut halves might engage the rough surfaces at an angle such that they would catch and cause the cut pieces to roll over, but this is prevented by tilting the tubular members 28.

After the fruit is cut in two and the parts slide down into the tubular members, the further upward movement of the funnel 14 carries the rollers 31 up the inclined cams, and when the funnel has reached the vertical position and has come to rest, the rollers 31 rest on a flat surface 35, with the perforated plates 29 in a substantially horizontal position.

Two plungers 36 having ribbed lower faces are secured to the lower ends of vertical shafts 37 having screw-threaded portions 38 engaging internally threaded elements 39 projecting from a supporting member 40. The shafts are driven by gear wheels 41 which in turn are driven by a gear wheel 42 mounted on the vertical shaft 43. At the lower end of the shaft 43 is secured a gear wheel 44 in mesh with a rack 45, having a rearward extension 46. A roller 47 mounted on the extension 46 engages within a cam groove 48 formed in a drum 49. The rack 22 which is in mesh with the gear wheel 21 has an extension 50 on which is mounted a roller 51 engaging another cam groove 52 in the drum 49.

Figure 1:
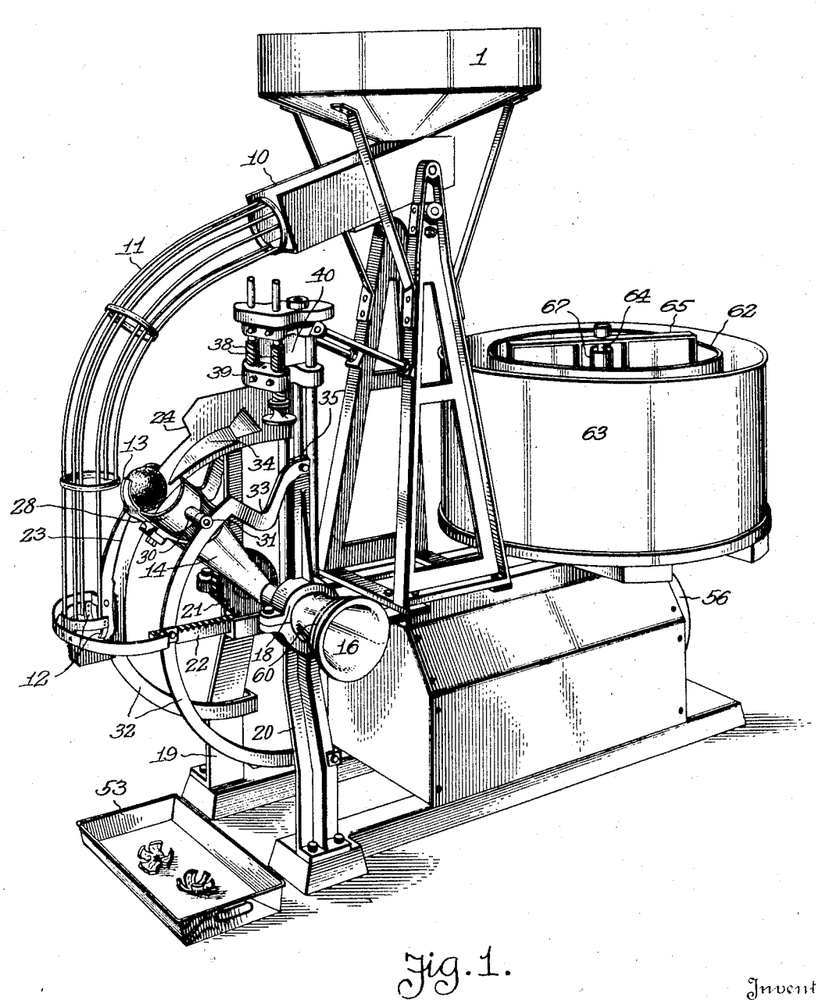
Figure 1 is a perspective view of a typical embodiment of my invention.
Figure 2:
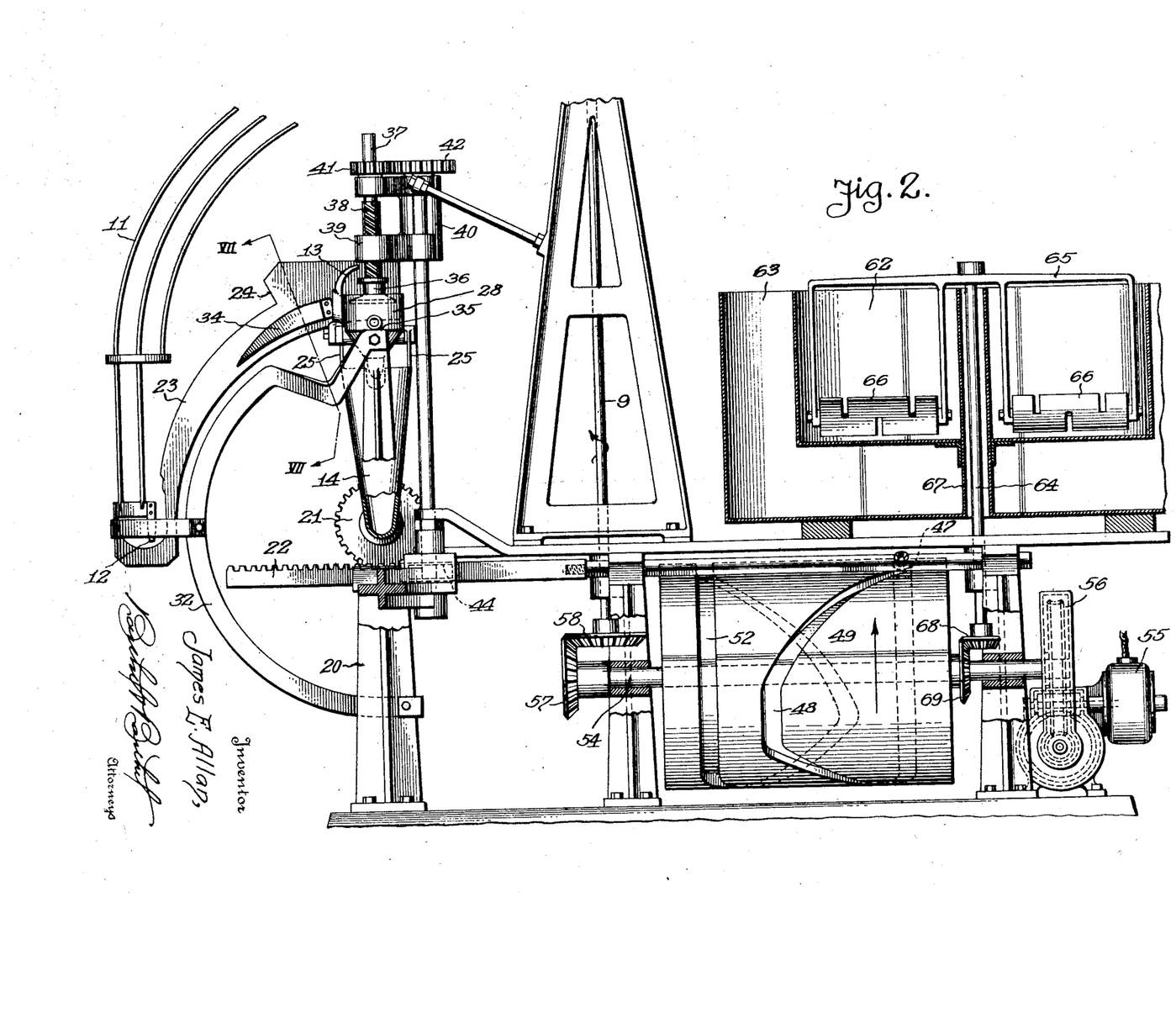
Fig. 2 is a side elevation, parts being shown in section and parts being broken away.
Figure 12:
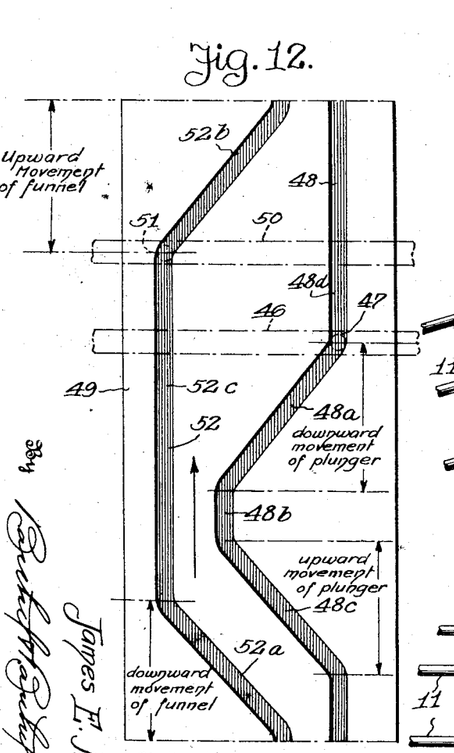
Fig. 12 is a developed view of the drum which controls the movements of the juice receptacle and the juice expressing devices.

In Fig. 12, which is a developed view of the surface of the drum, the movement during rotation is indicated by the arrow. The roller 47 has just come to the end of a dwell 48$^d$ during which the rack 45 has been at rest and consequently has held the gear wheel 44 and shaft 43 from rotation. The roller 51 has just left the active part 52$^b$ of its cam groove and is about to enter a dwell 52$^c$ during which the rack 22 and gear wheel 21 will be held stationary. Movement of the rack 22 has caused the gear 21 to rotate and the funnel 14 has been lifted to the vertical position shown in Fig. 2. The plungers are directly above the tubular members 28 and on each perforated plate 29 rests the cut surface of a half orange.

Figure 9:
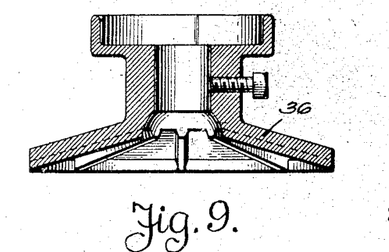
Fig. 9 is a section through a plunger.

As the drum moves about its axis as shown by the arrow, the roller 47 is thrust to the left by the active part 48$^a$ of the cam groove 48, moving the rack 45 (to the left in Fig. 6) and causing the rotation of gear 44, shaft 43, gears 42 and 41, and shafts 37. The screw threads of the portions 38 cause the shafts 37 to rotate, bringing the ribbed faces of the plungers 36 down into contact with the fruit and pressing them with a rotary movement against the ribbed surfaces of the perforated plates. The tubular members with their plates 29 form highly efficient juice extractors, the juice pressed out running down into the funnel and out at the end of the extension 16. The cup-shaped upper end of the plunger shown in Fig. 9 receives any oil from the screws 38. When the plungers have reached their lowermost position, the roller 47 enters a short dwell 48$^b$ holding the plungers down while the juice runs through the plates 29, and then the second active portion 48$^c$ of the cam groove drives the roller to the right, reversing the movement of the plunger shafts and the train of gears, and lifting the plungers to the top of their stroke where they are held while the funnel swings down to drop the empty rinds, and back with another orange. The roller 51 engages the active portion 52$^a$ of the cam groove 52 while the plungers are still rising and acts to pull the rack 22 (to the right in Fig. 6) to rotate the gear wheel 21, which causes the funnel to swing through an angle of almost one hundred and eighty degrees downward to a point where the rinds are dropped into a receptacle 53. There is no need for a dwell at the lower end of the swing, so the cam groove bends back at once, returning the funnel with a steady upward movement during which the fingers 13 lift the orange resting at the lower end of the chute and carry it up the blade 23 to the cutting edge 24 which determines the point at which the parts shall be severed to drop into the juice extractors.

The drum 49 is mounted on a shaft 54 which is driven by a motor 55 through a train of gears 56 adapted to give a proper speed of rotation. On the end of the shaft 54 opposite the motor is a beveled gear wheel 57 in mesh with a beveled gear wheel 58 secured on the lower end of the shaft 9. Each rotation of the drum causes a single rotation of the shaft 9 and results in a single rotation of the feeding means 2. The rotation of the cylinder 2 is arranged to deliver the orange to the chute after the fingers 13 have passed the lower end of the chute on their downward swing. The fruit rolls down into place while the funnel swings from a horizontal position downward and returns to the chute on its upward movement. There is no fruit at the end of the chute to obstruct the movement of the fingers 13 as they pass that point moving downward.

On the interior of the funnel, a series of annular ribs or shelves 59 are formed, the upper surfaces of which slope smoothly inward and downward so that the juice runs freely down the sides and drips off the sharp edges of the ribs. The lower side of these ribs is undercut to form a shelf or annular pocket when the funnel is inverted at the lower portion of its swing, thus preventing juice from running out of the funnel while the rind is being dropped.

The extension 16 of the funnel is made flaring so that the passage for the juice shall slope downward at all times during the swinging movement, and external ribs 60 are provided to prevent drops of juice which may cling to the outer lip of the extension 16 from running back on the outside.

The juice issuing from the extension 16 of the funnel 14 is received in any suitable vessel 61, from which it may be poured into the inner compartment 62 of a mixing chamber having an outer compartment 63 to receive ice or other cooling means. A shaft 64 carries at its upper end bracket arm 65 carrying stirring paddles 66 which move the juice into contact with the cold walls of the compartment to produce rapid cooling or which mix the juice with water, sugar, or other materials used in various drinks. The shaft 64 extends through a tubular member 67 which forms a support for the inner compartment 62, and at its lower end has secured a bevel gear wheel 68 in mesh with a bevel gear 69 on the shaft 54, this arrangement producing a constant rotation of the paddles 66 while the machine is in operation.

It will be obvious that various changes may be found desirable to adapt various portions of the device for use with other fruits, and if the same machine is to be used for several different fruits or for widely varying sizes of the same fruit, the feeding mechanism would be made with interchangeable cylinders and the juice extractors with interchangeable members best adapted for use with each fruit.

All such necessary modifications and adjustments are comtemplated as within the spirit of my invention as defined by the accompanying claims.

What I claim is:—

1. A juice extracting machine comprising a blade having a cutting edge, a carrier for fruit having a path of movement which brings the fruit into contact with the cutting edge and lengthwise thereof to sever the fruit into halves, means for positioning a cut half with its cut face in contact with a surface adapted for juice extraction, and means for forcing the fruit half section into contact with the surface to extract the juice.

2. A juice extracting machine comprising a blade having a cutting edge, a carrier for fruit having a path of movement which brings the fruit into contact with the cutting edge and lengthwise thereof to sever the fruit into halves, means for positioning the cut halves with their cut faces in contact with surfaces adapted for juice extraction, and means engaging the opposite surface of the fruit and forcing it with a rotary movement against the juice extracting surface.

3. A juice extracting machine comprising a blade having a cutting edge, a carrier for fruit having a path of movement which brings the fruit into contact with the cutting edge and carries the fruit lengthwise of the cutting edge and transversely of the blade, said blade having its cutting portion formed with a section extending abruptly transversely to the path of movement of the fruit and at an angle to the main portion of the blade to determine the point at which the fruit shall be completely severed.

4. A juice extracting machine comprising a blade lying in a vertical plane and having a cutting upper edge, a means for carrying a fruit lengthwise and transversely of the blade to a point at which the fruit is completely severed, a deflecting means having an inclined upper surface engaging the lower end of a cut section to move it farther from the plane of the blade than the center of gravity of the severed part, so that the top will slide downward in contact with the blade and the lower edge will slide outward down the inclined surface, and a member adapted for juice extraction positioned to receive the flat cut surface of the fruit as it slides off the deflecting means.

5. A juice extracting machine comprising an oscillating member, gripping fingers on the member having a path of movement in an arc of a circle, and a knife blade between the fingers having a curved cutting edge eccentric to the path of movement of the gripping fingers, said edge having a portion extending abruptly transversely to the path of movement of the fingers to provide a definite limiting point for the cutting action of the knife blade.

6. A juice extracting machine comprising a knife blade, a fruit carrier movable lengthwise of the blade, the configuration of the blade being such that fruit delivered to the blade by the carrier is completely severed at a definite point, deflecting means engaging the lower edge of the severed portion of the fruit, to deflect it outwardly from the blade when it has been severed and a juice extracting means having a pivoted member arranged to swing on its pivot to assume a position in which a receiving surface lies at an angle permitting the lower edge of the severed portion of fruit to slide downward to bring the cut surface into contact with the receiving surface.

7. A structure as in claim 6, having a reciprocating plunger to engage the fruit and force it into contact with the receiving surface.

8. A juice extracting machine comprising a cutting blade, a fruit carrier having a portion movable lengthwise of the blade, a pivoted member having one end supported by the fruit carrier and the other end engaging a cam having, opposite the point at which the fruit is completely severed, a portion permitting the pivoted member to swing on its pivot under the action of gravity to incline the upper surface of the pivoted member to receive the severed fruit.

9. A structure as in claim 8, having means to deliver the fruit with its cut surface in contact with the inclined surface of the pivoted member.

10. A juice extracting machine comprising a knife blade arranged in a vertical plane, a swinging member mounted on a horizontal pivot and having gripping fingers for fruit arranged on opposite sides of the blade and moving in an arc of a circle, the cutting edge of the blade being curved eccentric to the pivot of the swinging member and having a portion extending transversely to the path of movement of the fingers to determine the point at which the fruit will be completely severed, deflecting means arranged adjacent to that point to engage the lower end of a severed portion of fruit to force it outwardly from the blade, a pivoted receiving member mounted on the swinging member adjacent to the gripping fingers and a cam means arranged to cause the receiving surface to lie at a downward angle at the point at which the fruit slides from the deflecting member when it has been severed and the cam means having a portion causing the pivoted receiving means to assume a substantially horizontal position at the end of the movement of the swinging member, and a reciprocating plunger positioned above the receiving member at the end of its path of movement, adapted to engage the fruit and force it into contact with the receiving member with a rotary movement.

11. A machine for expressing fruit juices for drinks, comprising mechanism for delivering fruit one by one from a receptacle to a holder, mechanism for removing the fruit from the holder and bringing it into contact with severing means, mechanism for applying pressure to the fruit after it is severed, whereby to extract the juice, and means including cams for determining the periods when each mechanism is rendered active, and means for operating the machine.

12. A machine for expressing fruit juices for drinks, comprising delivering mechanism, carrying means, severing means, and pressing means, means for operating the moving parts, and a controlling means for causing the operations to proceed in the following sequence: delivery of the fruit, movement of the carrying means to bring the fruit into contact with the severing means until the severing is completed, and application of pressure to the severed portions of the fruit.

13. A machine for expressing fruit juices comprising, delivery mechanisms, carrying means, severing means, and pressing means, means for operating the moving parts and a controlling means for causing the operation to proceed in the following sequence: delivery of the fruit, movement of the carrying means to bring the fruit into contact with the severing means until the severing is completed, application of pressure to the severed portions of the fruit to extract the juices, removal of pressure and movement of the carrying means to discharge the refuse left after the juice is extracted.

In testimony whereof I affix my signature.

JAMES E. ALLAN.